2 Sheets--Sheet 1.

A. B. FARQUHAR.
Seeder and Fertilizer Distributors.

No. 151,964. Patented June 16, 1874.

Witnesses:
Henry N. Miller
N. K. Du Hamel

Inventor:
A. B. Farquhar.
Per H. S. Att.
Attorney.

AM. PHOTO-LITHOGRAPHIC Co. N.Y. (OSBORNE'S PROCESS.)

2 Sheets--Sheet 2.

A. B. FARQUHAR.
Seeder and Fertilizer Distributors.

No. 151,964. Patented June 16, 1874.

Witnesses:
Henry N. Miller
W. H. Du Hamel

Inventor:
A. B. Farquhar
Per
H. J. H. Hot.
Attorney.

UNITED STATES PATENT OFFICE.

ALLEN B. FARQUHAR, OF SALEM, OHIO.

IMPROVEMENT IN SEEDERS AND FERTILIZER-DISTRIBUTERS.

Specification forming part of Letters Patent No. 151,964, dated June 16, 1874; application filed March 23, 1874.

*To all whom it may concern:*

Be it known that I, ALLEN B. FARQUHAR, of Salem, county of Columbiana and State of Ohio, have invented certain new and useful Improvements in Seeder and Fertilizer, of which the following is a specification:

The nature of my invention consists in the construction and arrangement of a machine for planting corn, beans, &c., and fertilizer, as will be hereinafter more fully set forth.

In order to enable others skilled in the art to which my invention appertains to make and use the same, I will now proceed to describe its construction and operation, referring to the annexed drawings, in which—

Figure 1:
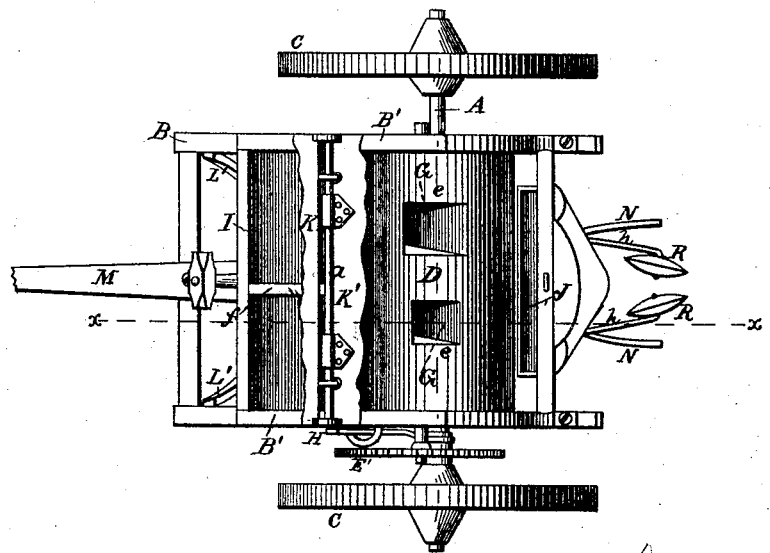
Figure 2:
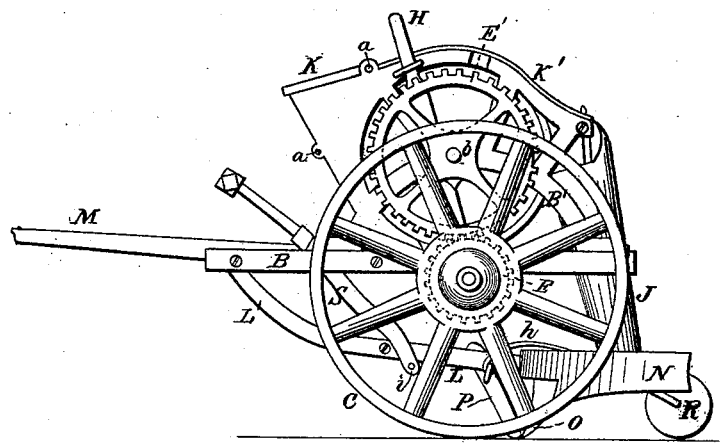
Figure 3:
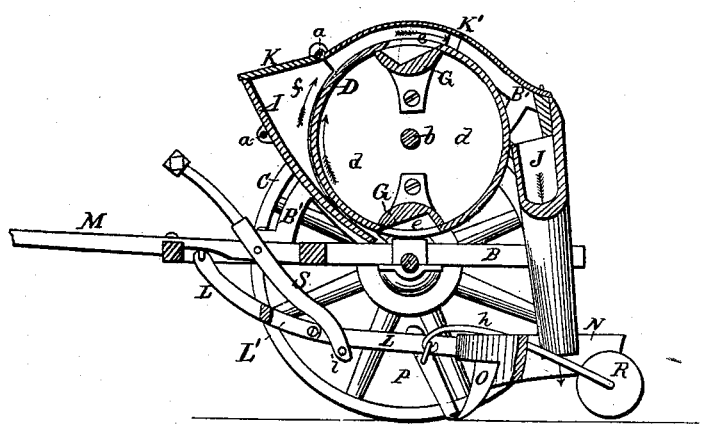

Figure 1 is a plan view of my machine, with the lids for the hopper and the cylinder partially removed. Fig. 2 is a side elevation of the same; and Fig. 3 is a longitudinal section through the line $x\ x$, Fig. 1.

A represents the axle, placed in suitable bearings on the under side of a frame, B, and having a driving-wheel, C, on each end. These wheels may either revolve on the axle or be secured on the same, and the axle revolve in its bearings. On each side of the frame B is secured a vertical frame-work, B', which are connected by rods $a\ a$, as shown. In the frames B' B' a shaft, $b$, has its bearings. To this shaft are secured a suitable number of radiating arms, $d\ d$, the outer ends of which are fastened to the interior of a hollow cylinder, D. The shaft $b$ and cylinder D are revolved by means of a cog-wheel, E, placed loosely upon the axle A, and connected with the hub of one of the driving-wheels by an ordinary clutch; and this cog-wheel E gears with a similar wheel upon one end of the shaft $b$. The cog-wheel E is moved in and out of gear with the driving-wheel hub by means of a lever, H. In the cylinder D are made four apertures, $e\ e$, arranged two and two upon opposite sides of the cylinder. On the interior of the cylinder are secured buckets G, one for each aperture $e$. In the front, between the two frames, B' B', is formed or attached the hopper I, the rear side of which is formed of the cylinder D. The hopper is, by a vertical partition, $f$, divided into two compartments, one for the corn and the other for fertilizer. As the cylinder revolves, the buckets take the desired quantity from each and carry it over backward, allowing it to drop into the upper end of a conductor, J. The conductor J is attached to a cross-bar, fastened between the rear portions of the two frames, B' B', and is sufficiently wide at its upper end to receive the contents of each pair of buckets at one time, and it tapers gradually to the lower end, where it is round. K and K' are the lids, respectively, for the hopper and cylinder. M represents the tongue of the machine, secured firmly to the frame B. On the under side of this tongue is hung the front end of the plow-beam L, which is curved upward for that purpose. The plow-beam L has a brace, L', secured to it on each side, the front ends of which braces are pivoted to the side beams of the frame B. On the rear end of the plow-beam L is secured a forked guard, N, and to the front side thereof is fastened the plow O. In front of the plow, to the plow-beam, is fastened a colter, P, for cutting the sod for the shovel, and to prevent the shovel from dropping behind the sod and tearing it up. To each side of the plow-beam L, in front of the plow, is hinged an arm, $h$, which is bent to pass over the top of the guard N, and then downward within the same. On the rear end of each arm $h$ is a wheel, R, which revolves on the ground in the furrow, and covers the articles deposited in the ground by the conductor J, the lower end of said conductor projecting into or between the prongs of the forked guard. S represents a slotted or stirrup lever, which straddles and is pivoted to the tongue M, the lower end of said lever also straddling the plow-beam L, and a pin, $i$, passed through the lower end of the lever supports the beam in the lever. By the means of this lever the plow-beam, with all its attachments, can be raised and lowered at will.

This machine can be used for planting corn, beans, broom-corn, &c., with fertilizer, at the same time. It can also be used for planting potatoes, the buckets for taking the fertilizer being, in a full-sized machine, made large enough to pick up a potato.

Having thus fully described my invention. what I claim as new, and desire to secure by Letters Patent, is—

1. The arrangement, between the frames B B', of the revolving cylinder D, with buckets G, and the vertically and longitudinally divided hopper I, the cylinder forming one side of the hopper, all substantially as and for the purposes herein set forth.

2. The combination of the beam L, forked guard N, shovel O, and colter P, with the lever S, all constructed as and for the purposes herein set forth.

3. The arms $h$, with wheels R, in combination with the plow-beam L and guard N, substantially as and for the purposes herein set forth.

In testimony that I claim the foregoing as my invention I hereunto affix my signature this 17th day of March, 1874.

ALLEN B. FARQUHAR.

Witnesses:
 CHAS. BOONE,
 HENRY C. JONES.